K. V. RUDIN.
CALCULATING MACHINE.
APPLICATION FILED AUG. 2, 1918.

1,360,322.

Patented Nov. 30, 1920.

Inventor
Karl Viktor Rudin
By
B. Singer, Atty

UNITED STATES PATENT OFFICE.

KARL VIKTOR RUDIN, OF STOCKHOLM, SWEDEN.

CALCULATING-MACHINE.

1,360,322.    Specification of Letters Patent.    Patented Nov. 30, 1920.

Application filed August 2, 1918. Serial No. 247,969.

*To all whom it may concern:*

Be it known that I, KARL VIKTOR RUDIN, correspondent, subject of the King of Sweden, residing at 12, Karduansmakaregatan, Stockholm, Sweden, have invented certain new and useful Improvements in Calculating-Machines, of which the following is a specification.

This invention relates to improvements in calculating machines, the object of the invention being to effect improvements in the construction of the longitudinally movable axle on which the numeral wheels are mounted, and of the lever which controls the lateral displacement of the carriage, to prevent simultaneous operation of the carriage displacing lever and the return to zero devices, and yet permit said lever and said return to zero devices to be alternately operated as may be required.

With the above and other objects in view, the invention consists in the construction, combination and arrangement of devices hereinafter described and claimed.

Figure 1:
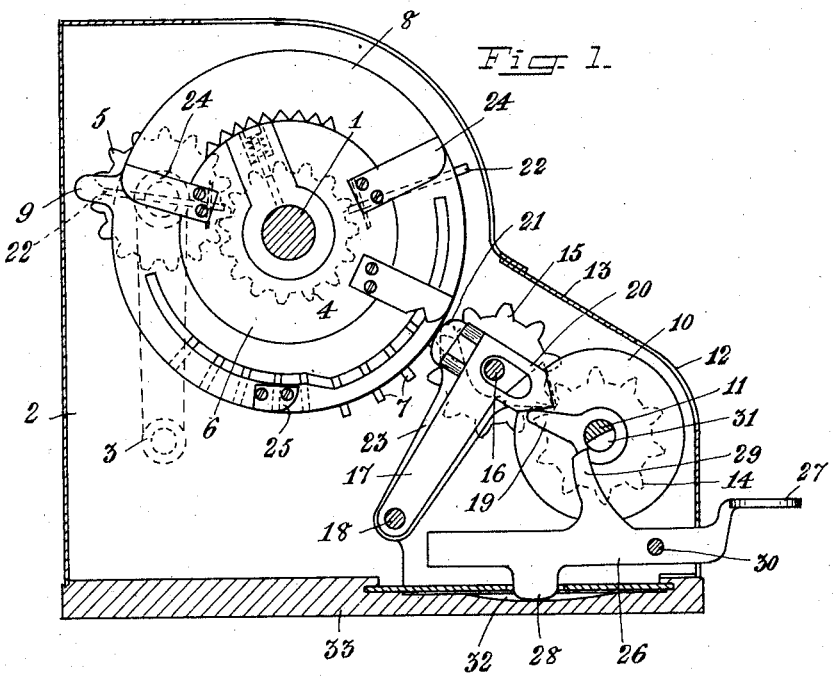
Figure 2:
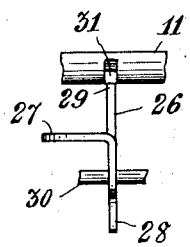
Figure 3:
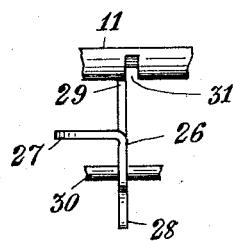

In the accompanying drawing:

Figure 1 is a vertical cross section of the machine with setting mechanism and registering mechanism, Fig. 2 is a front elevation of the carriage displacing lever and the axle of the registering mechanism, the notch of the axle in line with the arm of the lever, Fig. 3 is a similar view of the same and shows the notch of the axle out of line with the arm of the lever.

Referring to Fig. 1 a rotary shaft 1 is mounted in a pair of side walls 2 of the casing of the machine. The said shaft is operatively connected with the machine crank 3 through spur gears 4 and 5, and it carries a plurality of setting disks 6 each of which is provided with nine radial slots. Within the latter radially shiftable teeth 7 are located which with lateral noses engage in a cam slot formed in a cam disk 8 loosely mounted on the shaft 1. By rotating the said cam disk on the shaft 1 by means of a handle 9 any desired number of the teeth 7 can be shifted into a position beyond the periphery of the setting disks. The number of the teeth shifted beyond the periphery of the setting disks represents the value to be introduced in the calculation in each column of the registering mechanism. In front of the setting disks, the whole of which may be termed the setting mechanism, numeral wheels 10 are loosely mounted on a shaft 11 disposed parallel to the shaft 1. Each of the said numeral wheels is provided at its circumference with the numerical characters from "1" to "9" and the "0" sign, and one of the said characters of each column of numeral wheels is at a time displayed through a peep hole 12, made in a cover 13, which is common to all the numeral wheels. Each of the numeral wheels has a spur gear 14 secured to its side which is provided with ten teeth, and the latter are in mesh with the teeth of a transmission wheel 15 which is loosely mounted on a shaft 16 disposed parallel to the shaft 11 of the numeral wheels. The said transmission or intermediate gears 15 which are mounted on the same axis 16 are located in the plane of the radially shiftable teeth 7 of the setting disks 6, and when rotating the said disks 6 by means of the machine crank 3 the teeth 7 mesh with the teeth of the transmission wheel 15 so as to advance the same. Thereby also the numeral wheels are advanced a distance which corresponds to the number of teeth 7 projected into their operative positions beyond the periphery of the setting disks 6. In order to transmit a certain number to the numeral wheels 10 the operator sets the said number on the setting disks 6, whereupon he rotates the crank.

Carrying means are in known way provided between consecutive numeral wheels which shift a numeral wheel forward or backward the distance corresponding to one value, if the numeral wheel of the next lower order passes from its "9" position into its "0" position, or vice versa. Rocking levers 17 having the form of hammers are used for this purpose, which levers are loosely mounted upon a shaft 18 disposed parallel to the axis of the registering mechanism, and which extend with their free upper ends to points adjacent to the gear wheels 15. Each of the numeral wheels is provided with a pin 19 which strikes the head 20 of the hammer 17 so as to rock the latter, when the numeral wheel passes from its "9" position into its "0" position, and vice versa. Thereby a cam surface 21 of the rocking lever 17 is thrown into the path of a laterally shiftable tooth 22 of the coöperating setting disk 6. Upon rotation of the setting disk 6 the cam face 21 shifts the tooth 22 laterally and into mesh with the teeth of the transmission or intermediate gear wheel 15 coöperating with the numeral wheel of the next higher order. Thereby the said numeral wheel 10 is advanced the distance of one value. As, for the purpose of performing additions or subtractions, or multiplications or divisions, the crank can be turned either to the right or to the left, two teeth 22 and cam faces 21 are provided only one of which is operative when turning the crank in one direction. At the end of the carrying operation cam faces on the setting disks rock the levers 17 into their normal positions shown in Fig. 1.

The numeral wheels or the transmission or intermediate gears are locked by means of detents or rocking levers 23 which prevent the said wheel from overthrowing. Said detents or rocking levers are arranged in such a way that they by their own weight aim to mesh with the registering elements or the numeral wheels.

Hereby the detents or rocking levers are actuated by shoulders 24 and 25 of the setting mechanism.

The machine as above described is well known and forms no part of the present invention.

According to the present invention the lever 26 which in known way serves to displace the carriage containing the registering mechanism laterally along the setting mechanism is provided with an arm or projection 29 directed upward. The lever is further in known way provided with a handle 27 and a projection 28 engaging into series of slots or notches 32 in the bottom plate 33 of the machine. The lever is turnable on its pivot 30. The shaft 11 is in accordance with the invention, provided with a notch or slot 31 which, in the rest position of the zero adjustment or setting mechanism, lies opposite the arm 29, Fig. 2. In this position, conseqently, the lever 26 can, in a known way, be acted on for the purpose of displacing the carriage, the arm 29, in this arrangement, engaging in the notch or slot 31. In the case of the zero adjustment, on the other hand, in which arrangement the axle 11, in a known way, is displaced somewhat to the right, Fig. 3, the arm 29 will lie against the axle which intersects its path and hence the arm or lever 26 can not be turned on its pivot pin 30.

On the other hand, there follows that, during the displacement of the carriage of the calculating mechanism, when the arm 29 engages in the notch 31, the zero adjusting mechanism cannot be acted on, as, in this case, no displacement of the axle 11 is possible.

I claim:

In a calculating machine, the combination of a longitudinally movable numeral wheel axle having a transverse notch, a numeral wheel, a carriage in which said axle is mounted, a pivotally mounted lever to effect lateral displacement of the carriage, said lever having an arm of such length as to engage the axle and prevent turning of the lever when the numeral wheels are in operation, said notch being moved into alinement with and clearing said arm by the longitudinal movement of the axle and permitting movement of said lever when the zero adjusting or setting mechanism is in rest position.

In testimony whereof I affix my signature in presence of two witnesses.

KARL VIKTOR RUDIN.

Witnesses:
MALTE VIERKEGAARD,
FRITZ E. HALLIN.